_US005661250A_

United States Patent [19]
Katahira et al.

[11] Patent Number: 5,661,250
[45] Date of Patent: Aug. 26, 1997

[54] METHOD AND APPARATUS FOR MEASURING THE THICKNESS OF LAYERS COATED ON OPPOSITE SURFACES OF SHEET MATERIAL

[75] Inventors: Toshiaki Katahira; Satoru Nitta, both of Numazu, Japan

[73] Assignee: Toshiba Kikai Kabushiki Kaisha, Tokyo, Japan

[21] Appl. No.: 550,498

[22] Filed: Oct. 30, 1995

[30] Foreign Application Priority Data

Oct. 31, 1994 [JP] Japan .................... 6-267214

[51] Int. Cl.$^6$ .................... G01B 21/08; G01B 11/06
[52] U.S. Cl. .................... 73/865.8; 356/381; 364/563
[58] Field of Search .................... 73/865.8, 150 R, 73/159; 356/381, 382; 250/559.27, 559.28; 324/230, 231; 364/563

[56] References Cited

U.S. PATENT DOCUMENTS

| | | | |
|---|---|---|---|
| 3,892,490 | 7/1975 | Uetsuki et al. | 356/382 X |
| 4,937,093 | 6/1990 | Chino et al. | 427/10 |
| 5,091,647 | 2/1992 | Carduner et al. | 250/334.09 |

OTHER PUBLICATIONS

*Patent Abstracts of Japan:* Grp p775, vol. 12, No. 399, Abs.pub date, Oct. 24, 1988 (63-139202) "Method and Apparatus for Velectromagnetic Induction Type Thickness".

*Patent Abstracts of Japan:* Grp p724, vol. 12 No. 233, Abs. pub. date Jul. 5, 1988 (63-26502) "Method and Device for electromagnetic Induction Type Thickness Measurement".

Primary Examiner—Thomas P. Noland
Attorney, Agent, or Firm—Finnegan, Henderson, Farabow, Garrett & Dunner, L.L.P.

[57] ABSTRACT

A method of measuring the thicknesses of each layer coated on the both surfaces of the base material, which includes the steps of: measuring simultaneously a first distance between a first displacement meter and the surface of the layer coated on the one surface of the base material, a second distance between a second displacement meter and the surface of the layer coated on the other surface of the base material, and a third distance between a third displacement meter and the one surface of the base material; calculating a thickness (Ta) of the layer coated on the one surface of the base material by subtracting the value (Da) measured by the first displacement meter from the value (Dc) measured by the third displacement miter; calculating a whole thickness (T) of the coated sheet from the value (Da) measured by the first displacement meter and the value (Db) measured by the second displacement meter; and calculating a thickness (Tb) of the layer coated on the other surface of the base material by subtracting the thickness (Tc) of the base material and the thickness (Ta) of the layer coated on the one surface of the base material from the whole thickness (T).

1 Claim, 6 Drawing Sheets

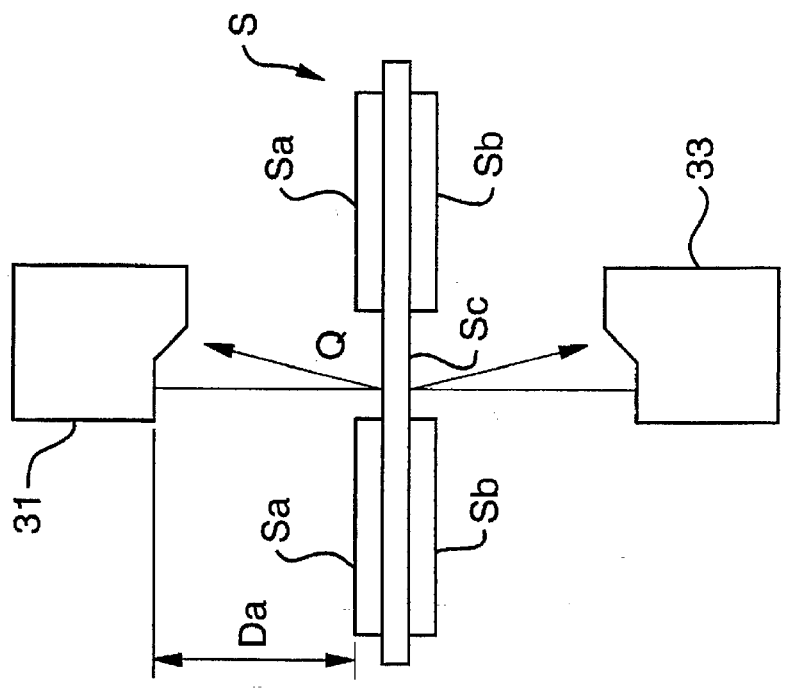
FIG. 1B *PRIOR ART*
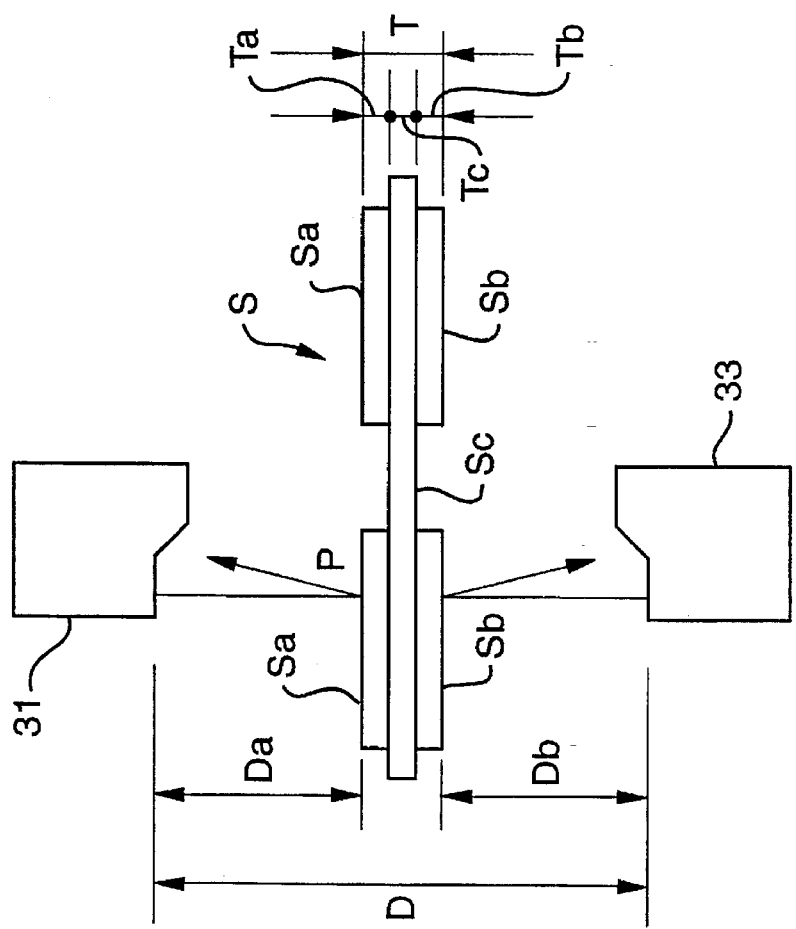
FIG. 1A *PRIOR ART*

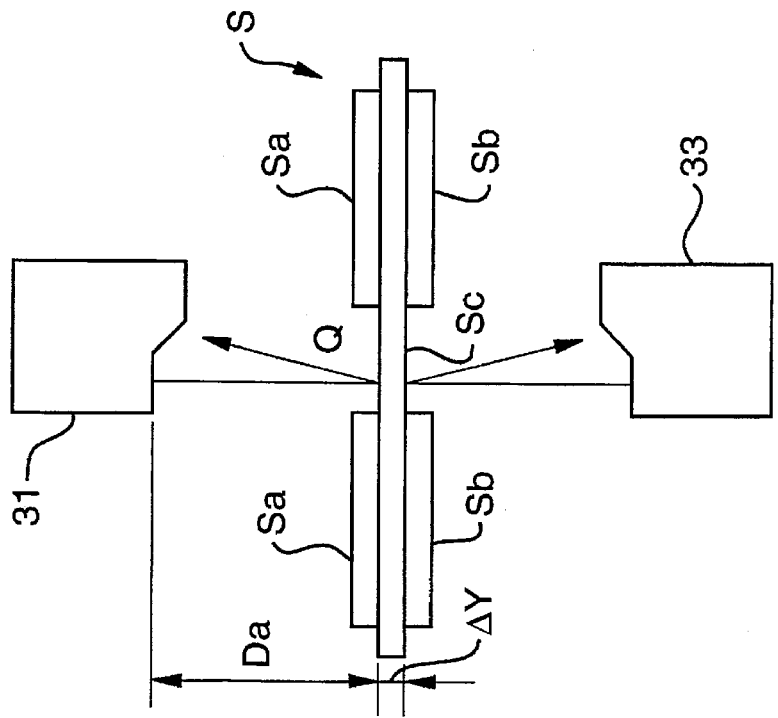
FIG. 2B *PRIOR ART*
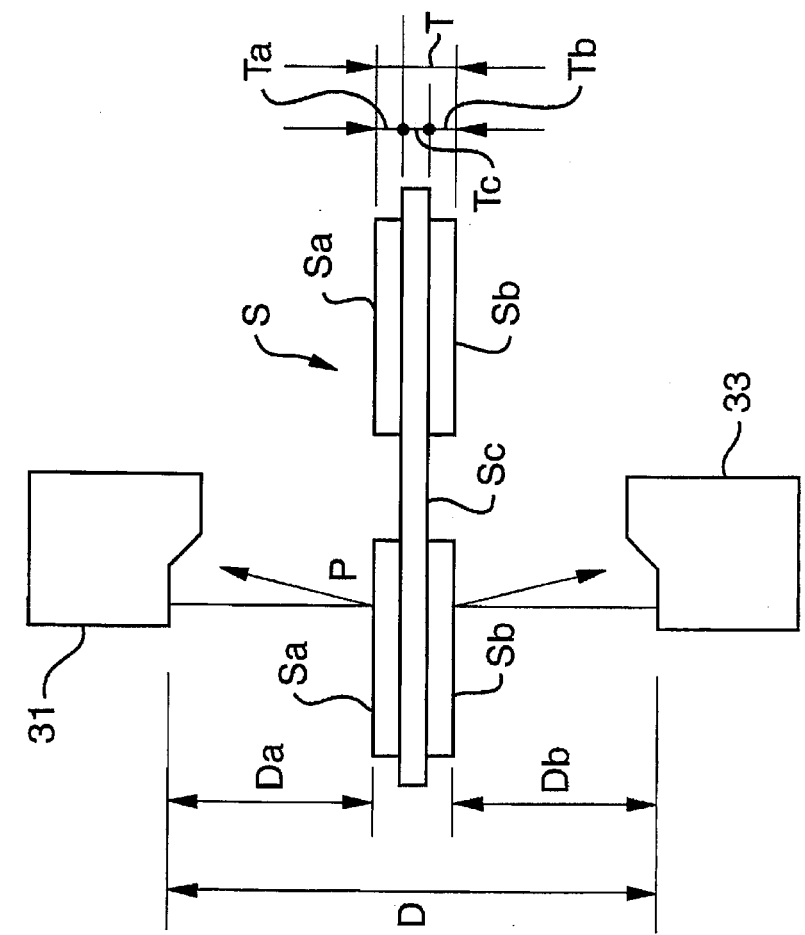
FIG. 2A *PRIOR ART*

METHOD AND APPARATUS FOR MEASURING THE THICKNESS OF LAYERS COATED ON OPPOSITE SURFACES OF SHEET MATERIAL

BACKGROUND OF THE INVENTION

1. Field of the Invention

The present invention relates to a method of measuring the thicknesses of each layer coated on the surface of the sheet material, and more paticularly relates to a method of measuring respectively the thickness of each layer coated on both surfaces of the sheet material and an apparatus for performing the method.

2. Description of the Prior Art

A duplex laser thickness meter is known which utilizes a laser displacement meter and the like, as an apparatus for measuring the thickness of a layer coated on the base material, such as adhesive tapes, magnetic tapes, electrode substrate of a battery and the like.

FIG. 1 shows an apparatus for measuring the thickness of a layer coated on the base material with a duplex laser thickness meter utilizing a laser displacement meter. This apparatus has a pair of displacement meters 31 and 33 arranged opposite to each other, to measure the distance between the one displacement meter 31 and the one surface of the coated sheet S with said displacement meter 31, and to measure the distance between the other displacement meter 33 and the other surface of the coated sheet S with said displacement meter 33.

These displacement meters 31 and 33 are devices to measure simultaneously each distance described above at the same position with each other with regard to the widthwise direction of the coated sheet S. And the distance to be measured directly by each displacement meter 31, 33 is the distance from the immovable reference position determined by the arranged position of the displacement meters 31 and 33 to the surface of the coated sheet S. Since the alienated distance D between the displacement meters 31 and 33 is a known value, assuming that the measured value by the displacement meter 31 is Da (distance between the displacement meter 31 and the one surface of the coated sheet 5), and the measured value by the displacement meter 33 is Db (distance between the displacement meter 33 and the other surface of the coated sheet S), the whole thickness T of the coated sheet S is calculated from the equation T=D−Da−Db with the measurement at the P-point in FIG. 1A, and the thickness Tc of the base material sheet of the coated sheet S is obtained with the measurement at the Q-point in FIG. 1B, respectively.

Here, if the position in the vertical direction of the coated sheet S shown in FIG. 1 is not changed, that is, if the sheet S Is not oscilated, at the time of measurement at P-point and at the time of measurement at Q-point, the thickness Ta of the layer Sa coated on the one surface of the sheet material Sc is calculated from the difference of the values Da measured by the displacement meter 31 at the time of measurement at P-point and at the time of measurement at Q-point, and the thickness Tb of the layer Sb coated on the other surface of the sheet material Sc is calculated from the difference of the values Db measured by the displacement meter 33 at the time of measurement at P-point and at the time of measurement at Q-point.

In the general coating process, however, since there is a drying process having a long free span, it is unavoidable to oscillate the coated sheet S, thereby it is unavoidable to cause an error in the thickness measurement of the layer.

As shown in FIG. 2A, at the time of the measurement at P-point, the coated sheet S is in the middle position between the displacement meters 31 and 33, but at the time of the measurement at Q-point, as shown in FIG. 2B, if the coated sheet S is displaced by $\Delta y$ to the side of the displacement meter 31, the thickness Ta of the layer Sa is measured to be smaller than the true value by $\Delta y$, and the thickness Tb of the layer Sb is measured to be larger than the true value by $\Delta y$.

The thickness of each layer is determined as (measured value on the surface of the base material)−(measured value on the surface of the layer). But, though the measured value on the surface of the base material is always changed due to the oscillation of the coated sheet, the measurement on the surface of the layer (measurement at P-point) and the measurement on the surface of the base material (measurement at Q-point) are measured with a time difference, therefore the measurement error is always caused.

SUMMARY OF THE INVENTION

The present invention is made in view of the problems described above, and therefore, the object of the present invention is to provide a method of measuring the thicknesses of each layer coated on both surfaces of the base material and an apparatus for measuring the thicknesses of each layer coated on both surfaces of the base material accurately without any error in spite of oscillation of the coated sheet.

In order to attain the above object, the present invention provides a method of measuring the thicknesses of each layer coated on both surfaces of the base material.

This method includes the steps of:

measuring simultaneously, a first distance between a first displacement meter and the surface of the layer coated on the one surface of the base material with the first displacement meter, a second distance between a second displacement meter and the surface of the layer coated on the other surface of the base material with the second displacement meter arranged opposite to the first displacement meter, and a third distance between a third displacement meter and the one surface of the base material with the third displacement meter arranged at a position away from the first displacement meter by a predetermined distance in the widthwise direction of the sheet;

calculating a thickness (Ta) of the layer coated on the one surface of the base material by subtracting the value (Da) measured by the first displacement meter from the value (Dc) measured by the third displacement meter:

calculating a whole thickness (T) of the coated sheet from the value (Da) measured by the first displacement meter and the value (Db) measured by the second displacement meter; and calculating a thickness (Tb) of the layer coated on the other surface of the base material by subtracting the thickness (Tc) of the base material and the thickness (Ta) of the layer coated on the one surface of the base material from the whole thickness (T).

Furthermore, in order to attain the above object, the present invention provides an apparatus for measuring the thicknesses of each layer coated on the both surface of the base material.

The apparatus according to the present invention includes: a first displacement meter arranged to face to the one surface of the coated sheet whose thickness value to be gained for measuring the distance from the one surface of the coated seat to the first displacement meter; a second displacement meter being arranged opposite to the first displacement meter to face to the other surface of the coated sheet whose thickness value to be gained for measuring the distance from the other surface of the coated seat to the second displacement meter; and a third displacement meter being arranged at a position away from the first displacement meter by a predetermined distance in the widthwise direction of the sheet to face the one surface of the coated sheet whose thickness value to be gained for measuring the distance from the one surface of the coated seat to the third displacement meter.

According to the structure described above, it is possible to measure simultaneously the distance to the surfaces of each layer coated on both surface of the base material with the first displacement meter and the second displacement meter, and measure the distance to the surface of the base material with the third displacement meter. Therefore the thickness Ta of the layer coated on the one surface of the base material is determined by subtracting the value Da measured by the first displacement meter from the value Dc measured by the third displacement meter. Then, the whole thickness T of the coated sheet is calculated from the value Da measured by the first displacement meter and the value Db measured by the second displacement meter. Consequently the thickness Tb of the coated layer on the other surface of the base material is calculated by subtracting the thickness Tc of the base material and the thickness Ta of the coated layer on the other face of the base material from the whole thickness T.

BRIEF DESCRIPTION OF THE DRAWINGS

FIG. 1A and 1B are views illustrating the conventional method of measuring the thicknesses of each layer coated on the surface of the sheet material.

FIG. 2A and 2B are views illustrating the conventional method of measuring the thicknesses of each layer coated on the surface of the sheet material.

DESCRIPTION OF THE PREFERRED EMBODIMENT

The embodiment of the present invention will now be described in detail with reference to the accompanying drawings.

Figure 3:
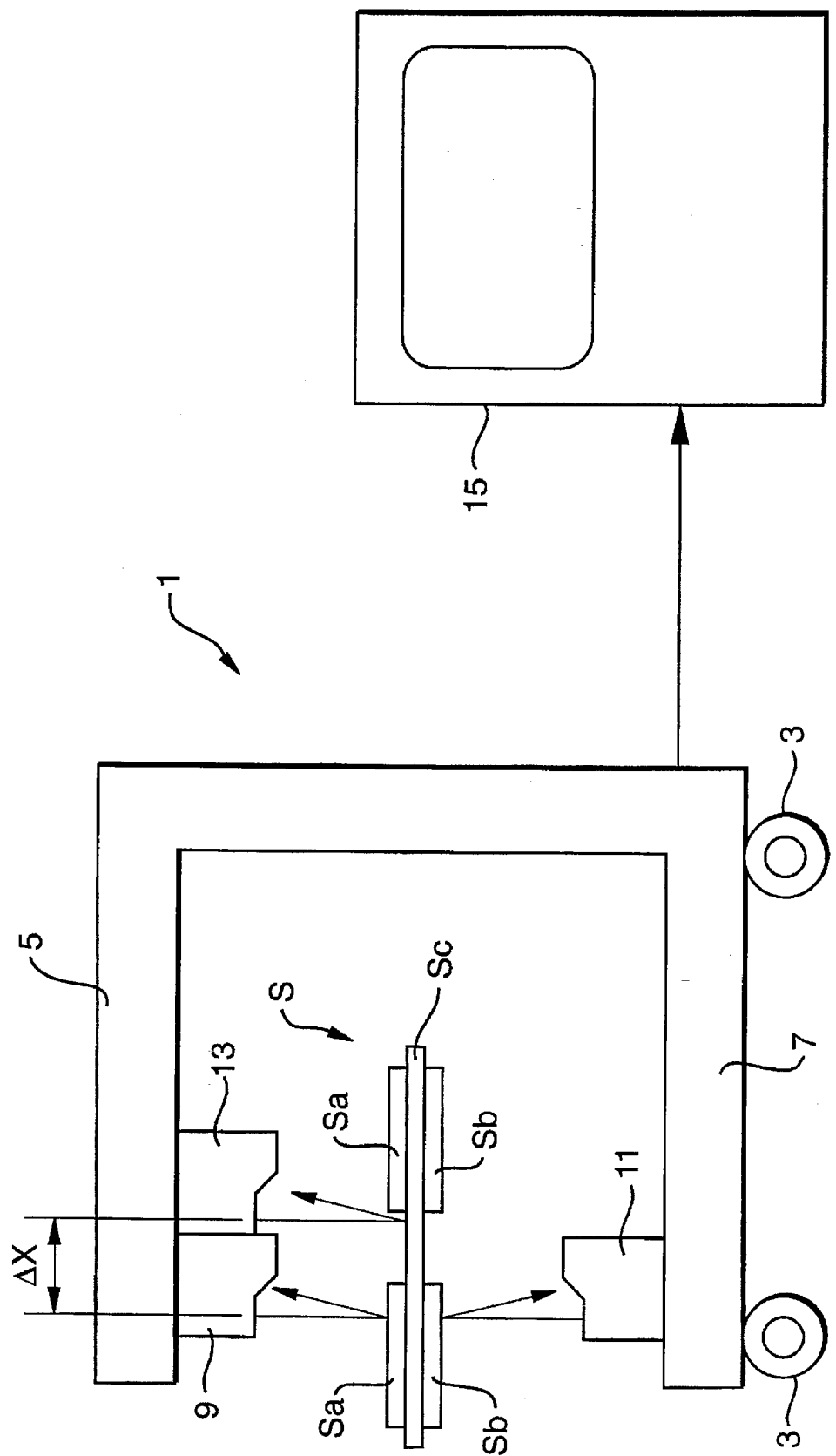
FIG. 3 is a schematic structural view showing one embodiment of the apparatus for measuring the thicknesses of each layer coated on the surfaces of the sheet material according to the present invention.

FIG. 3 shows one embodiment of the apparatus for measuring the thicknesses of each layer coated on both surfaces of a base material according to the present invention. The aparatus has an U-shaped movable frame 1, and the movable frame 1 is capable of moving and being displaced in the widthwise direction of the coated sheet S to be measured, that is, in the horizontal direction in FIG. 3, by a driving device 3.

Incidentally, in FIG. 3, the coated sheet S moves in the direction going through the sheet face at the right angle.

A first displacement meter 9 and a second displacement meter 11 are fixed respectively to the upper arm 5 and the lower arm 7 of the movable frame 1 as opposite to each other. The first displacement meter 9 is opposite to the upper surface of the coated sheet S to be measured, and measures the distance between the arranged position of it and the upper surface of the coated sheet S. The second displacement meter 11 is opposite to the lower surface of the coated sheet S to be measured, and measures the distance between the arranged position of it and the lower surface of the coated sheet S.

A third displacement meter 13 is fixed to the upper arm 5, at the position away from the first displacemet meter 9 by a predetermined amount $\Delta x$ in the widthwise direction of the coated sheet S. The third displacement meter 13 is opposite to the upper surface of the coated sheet S to be measured, and measures the distance between the arranged position per se and the upper surface of the coated sheet S.

The respective values measured by the first displacement meter 9, the second displacement meter 11 and the third displacement meter 13 are transferred to the computer system 15, and the computer system 15 calculates the thickness of the layer by the arithmetical processing based on the measured value from respective displacement meters.

Figure 4B:
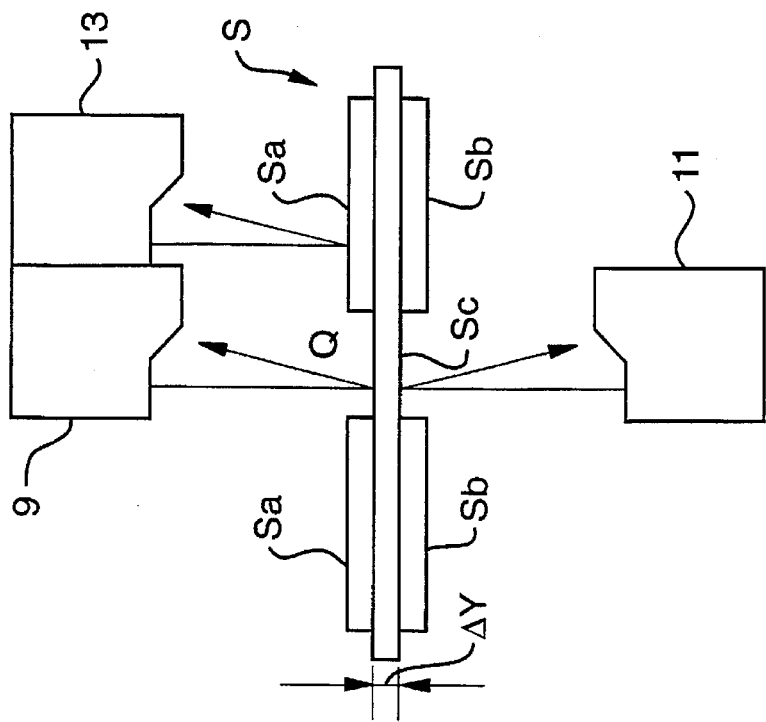
FIGS. 4A and 4B are views illustrating a method of measuring the thicknesses of each layer coated on the surface of the sheet material according to the present invention.

Next, the method of measuring the thickness of the layer will be described with reference to FIGS. 4A, 4B by using the apparatus measuring the thickness having the structure described above.

Figure 4A:
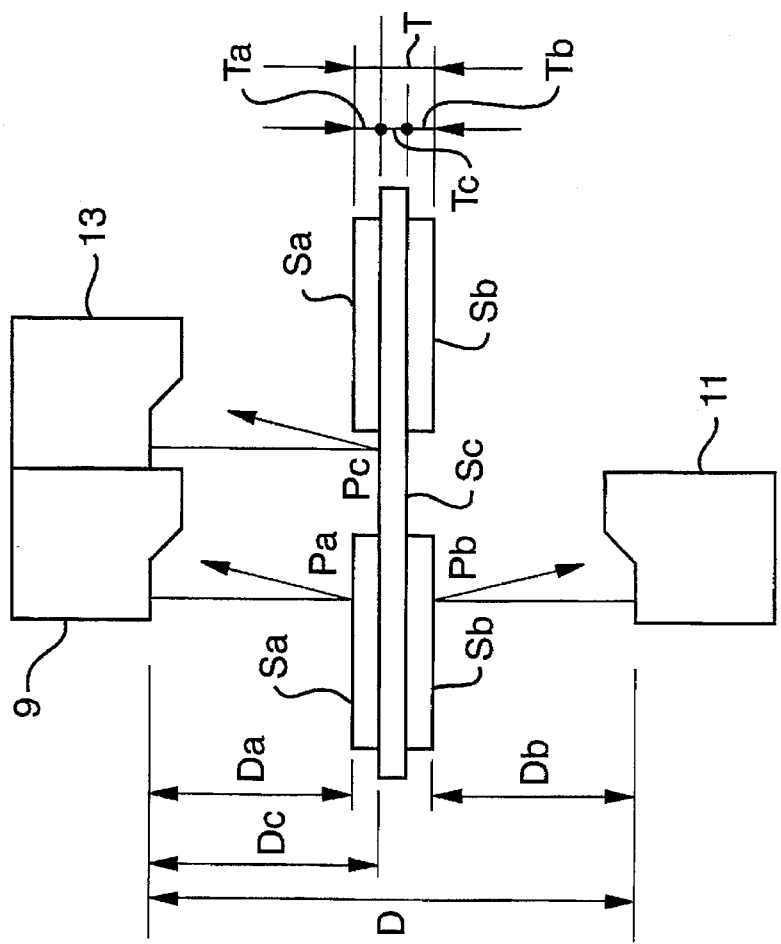

As shown in FIG. 4A, the distance between the arranged position of the first displacement meter and the surface (point Pa) of the layer Sa coated on the upper face of the base material Sc is measured by the first displacement meter 9, and at the same time, the distance between the arranged position of the second displacement meter and the surface (point Pb) of the layer Sb coated on the lower face of the base material Sc is measured by the second displacement meter, and the distance between the arranged position of the third displaement meter and the upper face of the base material Sc is measured by the third displacement meter.

Here, the value measured by the first displacement meter 9 is assumed to be Da, the value measured by the second displacement meter 11 is assumed to be Db, and the value measured by the third displacement meter 13 is assumed to be Dc.

Respective values Da, Db and Dc measured by these displacement meters are input to the computer system 15.

The computer system 15 calculates the thickness Ta of the layer Sa coated on the upper surface of the base material Sc by subtracting the value Da measured by the first displacement meter 9 from the value Dc measured by the third displacement meter 18. Since the value Dc measured by the third displacement meter 13 and the value Da measured by the first displacement meter 9 are the values measured simultaneously, even if the coated sheet S is oscillated, the thickness Ta of the layer Sa is accurately measured without including the error component due to the oscillation.

Furthermore, the computer system 15 calculates the whole thickness T of the coated sheet S from the value Da measured by the first displacement meter 9 and the value Db measured by the second displacement meter 11, and calculates the thickness Tb of the layer Sa coated on the lower surface of the base material Sc by subtracting the thickness Tc of the base material and the thickness Ta of the layer Sa coated on the upper surface of the base material Sc from the whole thickness T. Thereby, the thickness Tb of the layer Sb is accurately measured without including the error component due to the oscillation, irrespective of the oscillation of the coated sheet S.

In addition, the whole thickness T of the coated sheet S is calculated, as conventionally, from the equation: T=D−Da−Db, since the alienated distance D between the the first displacement meter 9 and the second displacement meter 11 is a known value. Furthermore, the thickness Tc of the sheet material Sc is determined by measuring the distance between the arranged position of the first displacement meter 9 and the upper surface of the base material Sc by the first displacement meter 9, and at the same time, the distance between the arranged position of the second displacement meter 11 and the lower surface of the base material Sc by the second displacement meter 11, and the equation of T=D−Da−Db is calculated by using the value Da measured by the first displacement meter 9 and the value Db measured by the second displacement meter 11 at this time, as shown in FIG. 4B.

Figure 5:
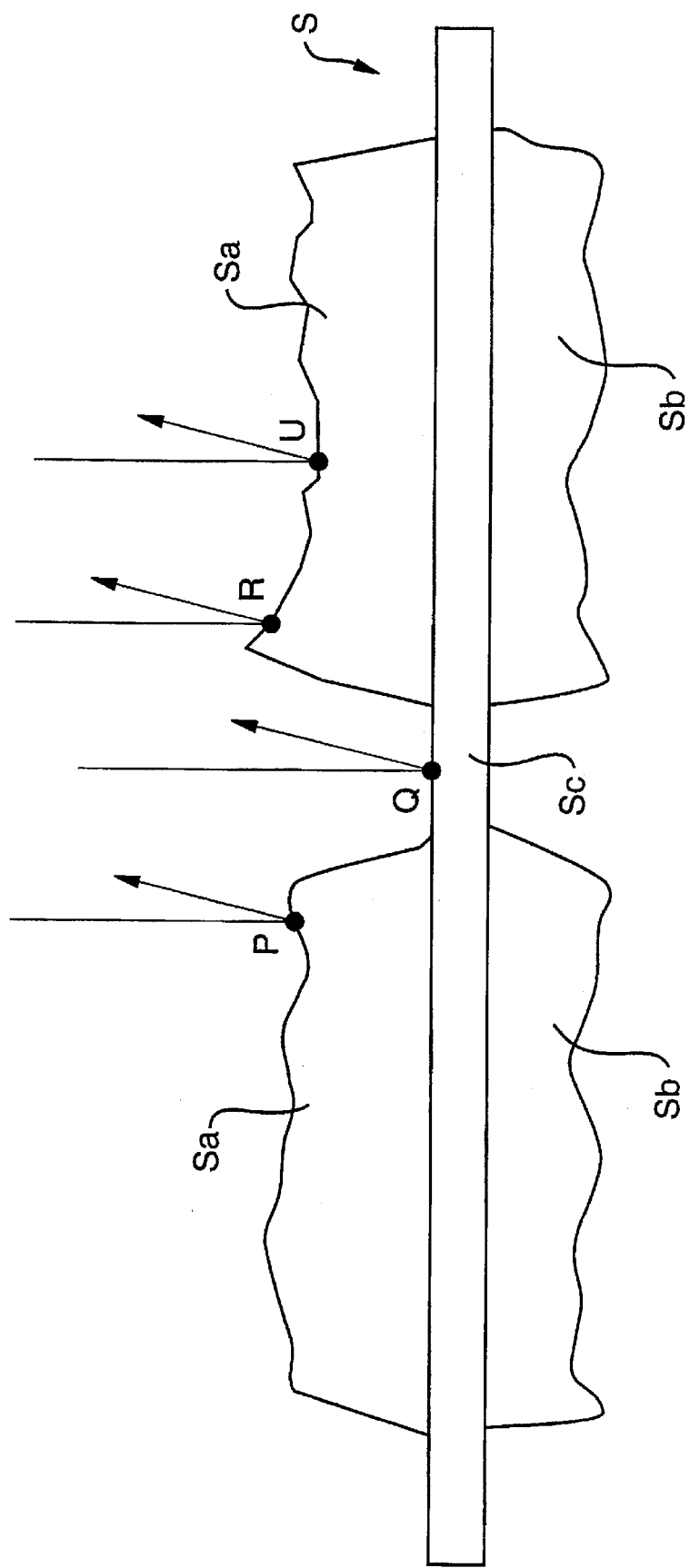
FIG. 5 is a view illustrating another example of measuring the thicknesses of each layer coated on the surface of the sheet material according to the present invention.

In FIG. 5, the difference in level (Ta)p between point P and point Q is accurately measured by simultaneously measuring point P with the first displacement meter 9 and point Q with the third displacement meter 13, and the difference in level (Ta)r is accurately measured by simultaneously measuring point Q with the first displacement meter 9 and point R with the third displacement meter 13

Then, the difference ΔTa in thickness of the layer Sa between point R and point U is determined by simultaneously measuring point R with the first displacement meter 9 and point U with the third displacement meter 13

As a result, the thickness (Ta)u of the layer Sa at point U is calculated by the following equation:

$$(Ta)u = (Ta)r + \Delta Ta$$

Figure 6:
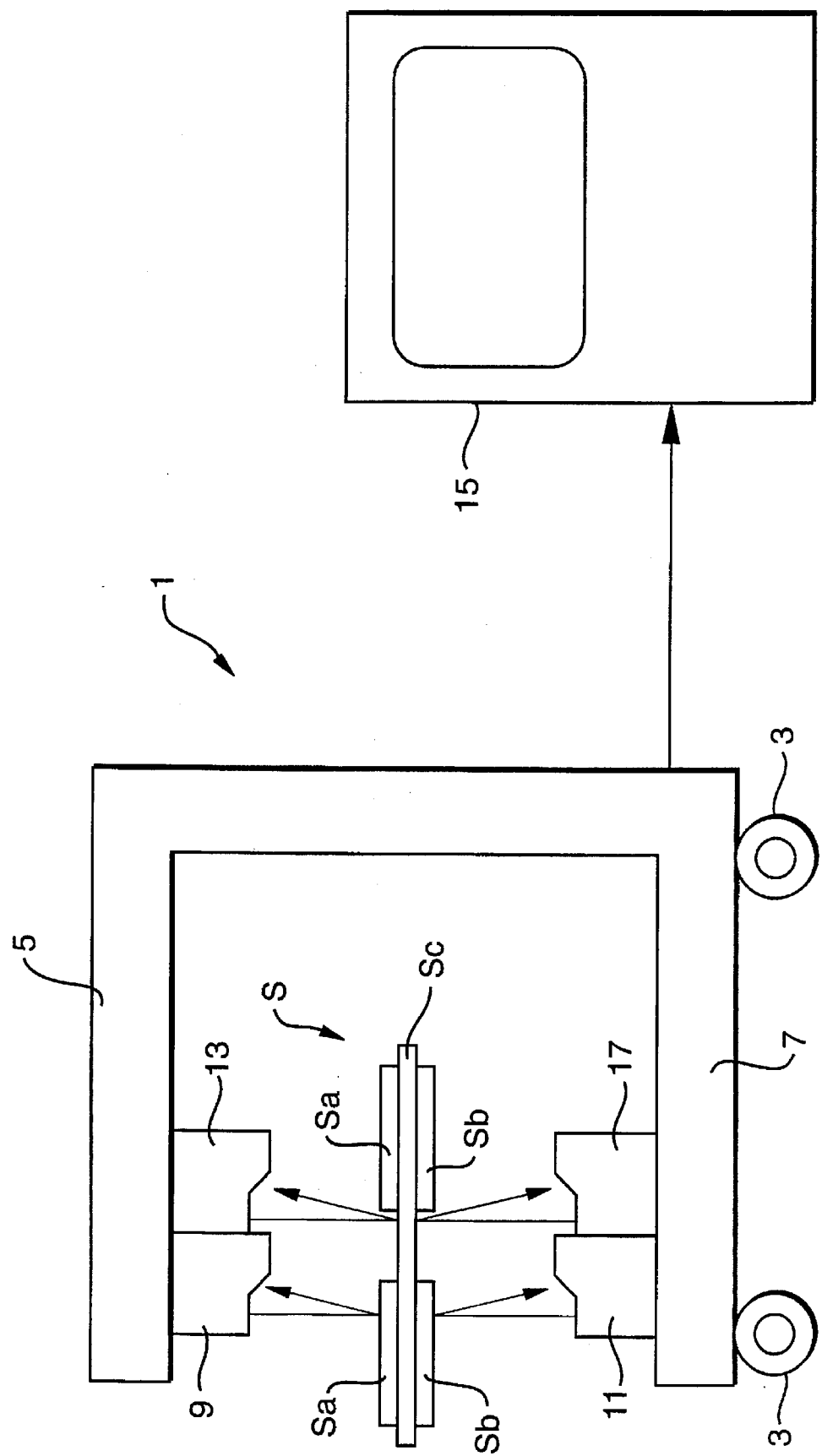
FIG. 6 is a schematic structural view showing an embodiment of the apparatus for measuring the thicknesses of each layer coated on the surfaces of the sheet material according to the present invention.

Incidentally, in the above embodiment, the third displacement meter 13 is mounted only on the side of the first displacement meter 9, but as shown in FIG. 6, the fourth displacement meter 17 may be mounted opposite to the third displacement meter 13 on the side of the second displacement meter 11.

In this case, simultaneously with the measurement on the surface of the lower layer by the second displacement meter 11, the fourth displacement meter 16 measures the distance between the arranged position of the fourth displacement meter 11 and the lower surface of the base material Sa, and assuming this measured value to be Dd, the thickness Tb of the lower layer Sb is accurately measured without including error component due to the oscillation of the coated sheet S, by subtracting the value Db measured by the second displacement meter 11 from the value Dd measured by the fourth displacement meter 17.

In the above description, the present invention has been described with regard to special embodiment, but the present invention is not restricted to these embodiments, and it will be obvious to those skilled in the art that various embodiments are possible within the scope of the present invention.

As understanding from the above description, according to the method of measuring the thickness of the coated seat and the aparatus of it according to the present invention, by simultaneously measuring each distance to the surface of the layers coated on both surface of the base material with the first displacement meter and the second displacement meter, and measuring the distance to the surface of the base material with the third displacement meter, the thickness of the layer coated on both faces of the base material is accurately measured without including any error, irrespective of the oscillation of the coated sheet, respectively by the arithmetical processing.

What is claimed is:

1. A method of measuring the thicknesses of layers coated on opposing surfaces of a base material, comprising the steps of:

measuring simultaneously:
a first distance (Da) between a first displacement meter and the surface of the layer coated on one surface of the base material with the first displacement meter,
a second distance (Db) between a second displacement meter and the surface of the layer coated on the opposite surface of the base material with the second displacement meter arranged at a known distance opposite to the first displacement meter, and
a third distance (Dc) between a third displacement meter and the one surface of the base material with the third displacement meter arranged at a position away from the first displacement meter by a predetermined distance in a widthwise direction Of the sheet;

calculating a thickness (Ta) of the layer coated on the one surface of the base material by subtracting the value (Da) measured by the first displacement meter from the value (Dc) measured by the third displacement meter;

calculating a whole thickness (T) of the coated sheet from the value (Da) measured by the first displacement meter and the value (Db) measured by the second displacement meter;

calculating a thickness (Tb) of the layer coated on the opposite surface of the base material by subtracting the thickness (Tc) of the base material and the thickness (Ta) of the layer coated on the one surface of the base material from the whole thickness (T).

* * * * *